United States Patent [19]

Zvanut et al.

[11] Patent Number: 4,909,463
[45] Date of Patent: Mar. 20, 1990

[54] CLAMPING ARRANGEMENT

[75] Inventors: Gary J. Zvanut, Skokie; Edward J. Rogers, Chicago, both of Ill.

[73] Assignee: S&C Electric Company, Chicago, Ill.

[21] Appl. No.: 296,376

[22] Filed: Jan. 6, 1989

Related U.S. Application Data

[63] Continuation of Ser. No. 89,705, Aug. 26, 1987, abandoned.

[51] Int. Cl.$^4$ .............................................. F16L 3/00
[52] U.S. Cl. ............................ 248/219.4; 248/231.6
[58] Field of Search .................... 248/231.6, 231, 230, 248/219.4, 219.3, 218.4, 217.3, 74.4, 316.6, 225.31, 229, 228; 24/525, 569, 277

[56] References Cited

U.S. PATENT DOCUMENTS

| | | | |
|---|---|---|---|
| 1,225,301 | 5/1917 | Wolfe | 248/230 X |
| 1,812,203 | 6/1931 | Gaskill | 248/219.4 |
| 1,945,332 | 1/1934 | Robinson | 248/228 X |
| 2,869,201 | 1/1959 | Wolff | 248/214 |
| 2,993,254 | 7/1961 | Carson | 24/277 |
| 3,245,642 | 4/1966 | Dicke | 248/230 X |
| 3,720,395 | 3/1973 | Schuplin | 248/229 |
| 4,209,155 | 6/1980 | Florian | 248/74.4 X |
| 4,519,515 | 5/1985 | Frazier et al. | 248/231.6 X |

FOREIGN PATENT DOCUMENTS

| | | | |
|---|---|---|---|
| 24467 | 8/1930 | Australia | 248/230 |
| 142043 | of 1930 | France | 248/230 |
| 354594 | 7/1961 | Switzerland | 248/230 |
| 1153073 | 4/1985 | U.S.S.R. | 403/363 |

Primary Examiner—Alvin C. Chin-Shue
Attorney, Agent, or Firm—James V. Lapacek

[57] ABSTRACT

A clamping arrangement is provided that clamps a switch pole-unit (or portion thereof) to a support member. In a preferred embodiment, the clamping arrangement includes a first member that functions as a pole-unit base to support the switch pole-unit, a second member, and facilities for clamping the first and second members about the support member. The first member includes notches that each have a length that is greater than or equal to the dimension of a predetermined portion of the support member that is assembled to the first member. The clamping arrangement further includes provisions operative during or after that apply a force to secure the support member in the notches so as to prevent any movement of the support member relative to the notches of the first member; e.g., by forcing the support member into engagement with a first end of each of the notches. The force-applying provisions in one arrangement include tangs which extend from the first member and are positioned so as to extend adjacent to the second end of each of the notches. The tangs are effective to accommodate a predetermined range of dimensions for the support member and also provide self-alignment of the clamping arrangement during assembly. In a preferred arrangement, the second member also includes a notch that is dimensioned to accommodate a predetermined portion of the support member that is assembled to the second member.

20 Claims, 3 Drawing Sheets

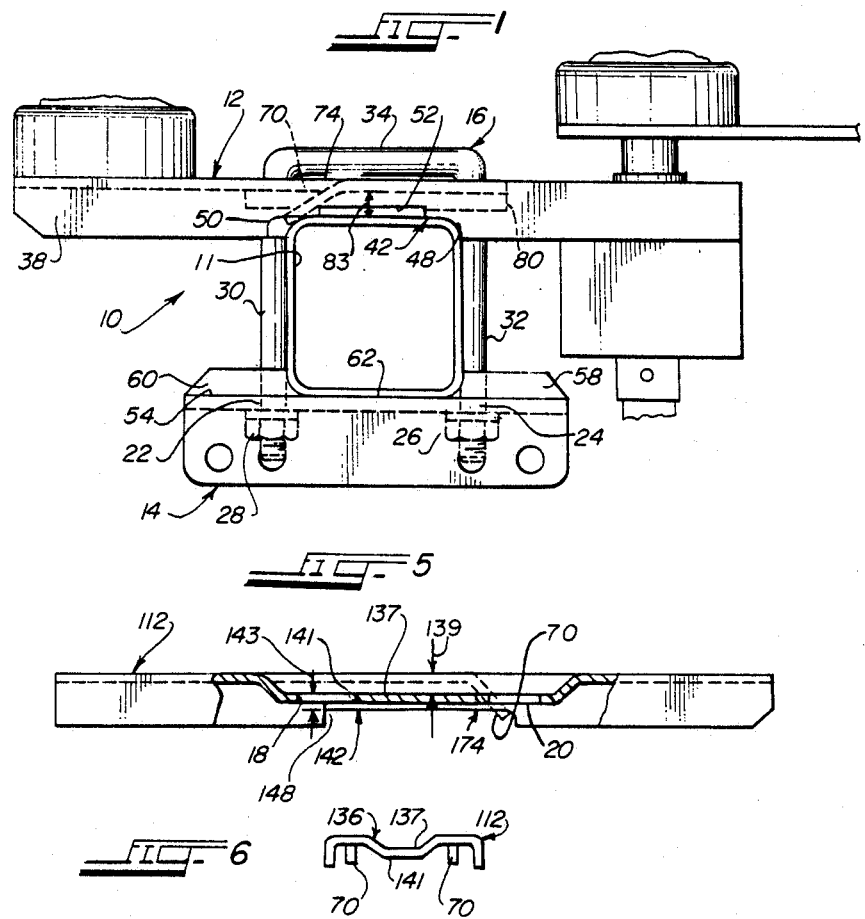

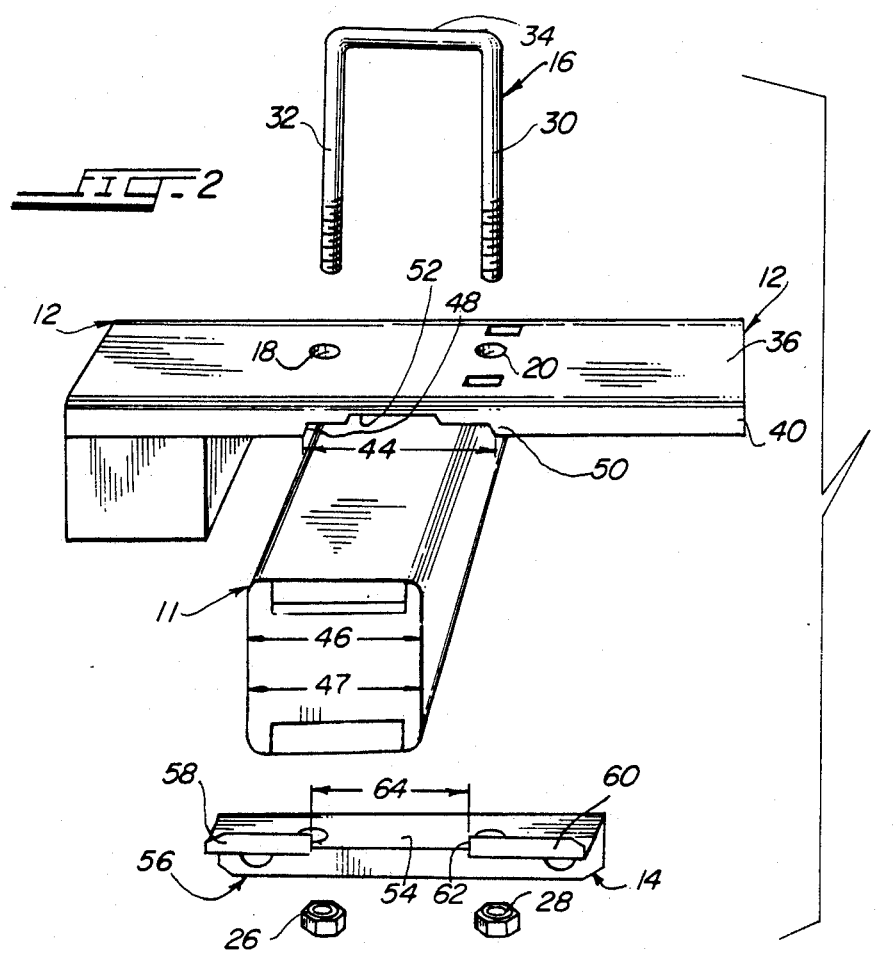
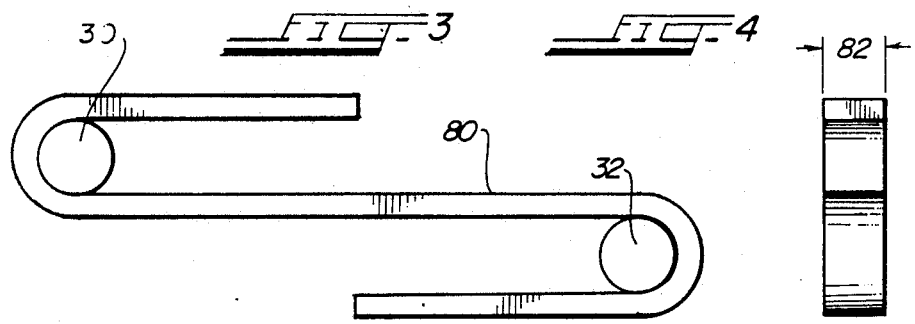

CLAMPING ARRANGEMENT

This is a continuation of application Ser. No. 089,705 filed Aug. 26, 1987, now abandoned.

BACKGROUND OF THE INVENTION

1. Field of the Invention

The present invention relates generally to the field of clamping arrangements and more particularly to a clamping arrangement for an electrical switch pole-unit that is clamped to a support member.

2. Description of the Related Art

Various clamping arrangements are known for affixing electrical switch pole-units to support members. For example, the Side-Break Integer Style Alduti-Rupter Switch available from S and C Electric Company, Chicago, Illinois, utilizes a clamping arrangement designated "Quadriform" that applies clamping force to all four sides of the support member. The clamp elements, two generally L-shaped members that are formed with 85° corner angles, are elastically tensioned by conformance to the contour of the rectangular support member when clamped to each other by fasteners. While this arrangement does effectively clamp the switch pole-unit to the support member, it does not lend itself to accommodating tolerances in the dimensions of the support member.

Another clamp arrangement utilizes two U-shaped members that include fastening flanges that are bolted together about a rectangular support member; for example, the Type D-7 switch available from A. B. Chance Company, Centralia, Mo. While this arrangement may be generally useful, it does not lend itself to both providing secure clamping action and accepting tolerances in the dimensions of the support member.

Thus, neither of these clamp arrangements provide a simple, economical design that satisfies all requirements.

SUMMARY OF THE INVENTION

Accordingly, it is a principal object of the present invention to provide a clamp arrangement for securely clamping a switch pole-unit to a support member that is relatively simple both to manufacture and to assemble, and that can accommodate tolerances in dimensions and various types of material of the support member while meeting the rather demanding clamping stability required for switch pole-units.

It is another object of the present invention to provide a clamping arrangement for a switch pole-unit that prevents displacement of the switch pole-unit along a support member or in any other way with respect to the support member.

These and other objects of the present invention are efficiently achieved in a clamping arrangement that clamps a switch pole-unit (or portion thereof) to a support member. In a preferred embodiment, the clamping arrangement includes a first member that functions as a pole-unit base to support the switch pole-unit, a second member, and facilities for clamping the first and second members about the support member. The first member includes notches that each have a length that is greater than or equal to the dimension of a predetermined portion of the support member that is assembled to the first member. The clamping arrangement further includes provisions operative during or after assembly that apply a force to secure the support member in the notches so as to prevent any movement of the support member relative to the notches of the first member; e.g. by forcing the support member into engagement with a first end of each of the notches. The force-applying provisions in one arrangement include tangs which extend from the first member and are positioned so as to extend adjacent to the second end of each of the notches. The tangs are effective to accommodate a predetermined range of dimensions for the support member and also provide self-alignment of the clamping arrangement during assembly. In a preferred arrangement, the second member also includes a notch that is dimensioned to accommodate a predetermined portion of the support member that is assembled to the second member.

BRIEF DESCRIPTION OF THE DRAWING

The invention, both as to its organization and method of operation, together with further objects and advantages thereof, will best be understood by reference to the following specification taken in conjunction with the accompanying drawing in which like reference characters refer to like elements and in which:

FIG. 1 is an elevational view of the clamping arrangement of the present invention when assembled to clamp a switch pole-unit to a support member;

FIG. 2 is an exploded view of the clamping arrangement illustrating the component parts and their assembly;

FIGS. 3 and 4 are front and side elevational views, respectively, of a spacer element that is utilized in the preferred embodiment of the clamping arrangement;

FIGS. 5 and 6 are front and side elevational views, respectively, of an alternate first member for use with the clamping arrangement of FIGS. 1 and 2.

DETAILED DESCRIPTION

Figure 7:
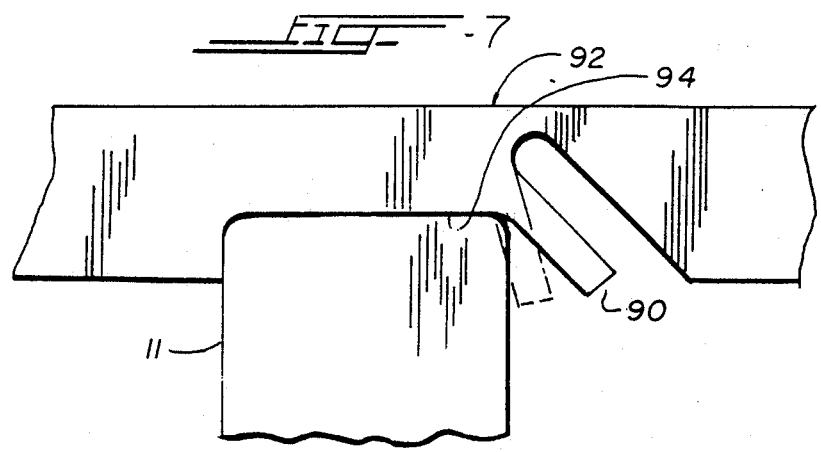
FIGS. 7, 8, and 9 are partial front elevational views of additional alternate first members for use with the clamping arrangement of FIGS. 1 and 2.

Referring now to FIGS. 1 and 2, the clamping arrangement 10 of the present invention is particularly suited for the affixing of an electrical interrupter switch or the like to a support member 11 functioning as a switch base. The clamping arrangement 10 includes a first member 12 which also functions as a pole-unit base for switch pole-unit 15, a second member 14 which also functions as a dead-ending bracket, and a U-bolt 16 for clamping the first and second members 12 and 14 about the support member 11. As is known to those skilled in the art, the function of this dead-ending bracket is to provide a convenient attachment point for dead-ending the line while relieving the switch pole-unit 15 from forces exerted by the direct connection of power lines to the switch pole-unit 15.

The U-bolt 16 is inserted through holes 18,20 in the first member 12, around the support member 11, and through holes 22,24 of the second member 14. Nuts 26,28 are threaded onto the lower threaded portions of the legs 30,32 of the U-bolt 16. Accordingly, when the clamping arrangement 10 is assembled, the bight 34 of the U-bolt 16 clamps the first member 12 against the support member 11 and the nuts 26,28 draw the second member 14 against the support member 11.

Specifically, the first member 12 is a channel having a base or web 36 and downwardly extending flanges 38,40. A notch referred to generally at 42 is provided in each of the flanges 38,40 and includes an overall length 44 that is greater than or equal to the expanse or width 46 of the support member 11. Notch 42 includes slightly rounded corners at the first 48 and second 50 ends thereof which generally conform to the radius of curvature of the support member 11. Additionally, the depth of the notch 42 includes a stepped increase at 52 which serves to define the region of contact between the support member 11 and the first member 12. The second member 14 has a generally Z-shaped cross section with a base section 54 in which the holes 22,24 are provided. A first flange 56 extends downwardly at right angles to the base 54. Two flange portions 58,60 extend upwardly at approximately right angles to the base 54 so as to define a notch 62. The notch 62 has a length 64 to allow for the overall expanse or width 47 of the support member 11 in accordance with any tolerances thereof.

After the clamping arrangement 10 is assembled about the support member 11 as shown in FIG. 1, it should be noted that the suupported member 11 engages the first end 48 of the notch 42 while there is a clearance between the support member 11 adjacent the second end 50 of the notch 42. The first member 12 is provided with two or more tangs 70 which, for example in the specific illustrative embodiment, are lanced from the base 36 of the first member 12. The tangs 70 extend downwardly and are located along the base 36 such that when the clamping arrangement 10 is assembled about the support member 11, the tangs 70 contact the support member 11 in the vicinity of the second end 50 of the notch 42. The tangs 70 are sufficiently stiff to provide a desirable securing force when contacted and deformed by the support member 11. As the nuts 26,28 are tightened on the U-bolt 16, the tangs 70 provide a force to secure the support member 11 against the first end 48 of the notch 42 such that positive and secure alignment of the first element 12 is achieved with respect to the support member 11 to ensure the precise, rigid and positive positioning of the swtich pole-unit 15. Thus, the clamping arrangement 10 with the provision of the tangs 70 (or equivalent) is effective to prevent slippage of the switch pole-unit 15 along and/or about the support member 11. In a specific embodiment, the first member 12 is fabricated from ¼ hot rolled steel. Due to the properties of materials, the tangs 70 are elastically tensioned. It should also be noted that during assembly, the tangs 70 provide for self-aligning of the first member 12 relative to the support member 11.

In the preferred embodiment, the tangs 70 are positioned as shown in FIGS. 1 and 2 and extend at approximately a 45° angle. Of course, it should be understood that the tangs 70 could be arranged at various other angles, although angles in the range of 30°-60° are most suitable. In any case, the provision of the tangs 70 with respect to the first end 48 of the notch 42 is selected so as to position the tangs 70 to contact the support member 11 before the support member 11 contacts the notch 42 at 74 adjacent the second portion 50 of the notch 42. Thus, some elastic deformation of the tangs 70 is accomplished to provide the desired securing force and to accommodate for variations in the expanse 46 of the support member 11. As the nuts 26,28 are tightened, the tangs 70 deflect upwardly and to the left in FIG. 1, with the support member 11 being urged into contact with the notch 42 at 74. The depth of the notch 42 at 48,50 is selected to be large enough to encompass the rounded corners of the support member 11. In this regard, it should be noted that the clamping arrangement 10 is applicable to support members of various cross sections including circular. The length and depth of the notch 42 are determined to cooperate with the particular cross section of the support member 11.

In another specific embodiment, the tangs 70 are provided by the attachment of tang members to the base 36. In yet other embodiments, the tangs 70 are either fabricated from other portions of the first member 12 or provided as separate elements. For example, FIG. 7 illustrates a tang 90 that is fabricated from the first member 92 to provide a notch 94 where the tang 90 defines one end of the notch 94. Of course, it should be realized that if the tangs 70 are not carried by the first member 12, assembly is rendered more complex.

It can be seen that the larger expanse 44 of the notch 42 of the first element 12 with respect to the expanse 46 of the support member 11 along with the force applied by the tangs 70 prevents any looseness and potential movement of the first member 12 with respect to the support member 11 that might result if the tangs 70 or similarly functioning equivalents were not provided and the notch 42 were dimensioned to accommodate the maximum expanse of the support member 11 accounting for tolerances. Additionally, the provision of the notch 42 and the tangs 70 avoid the instabilities that might result if the expanse 44 of the notch 42 were dimensioned to tightly fit with a particular-dimensioned support member 11; i.e., support members having various tolerances and finish surfaces could result in incorrect positioning of the support member 11 with respect to the notch 42, such that skewing of the components and resultant slippage might occur. It should also be noted that the flanges 58,60 which define the notch 62 provide additional rigidity and security to the overall clamping. The expanse 46 of the support member 11 represents the predetermined width of the one or more surfaces or portions of the support member 11 which may be arranged to face the first member 12. Similarly, the expanse 47 of the support member 11 represents the predetermined width of the one or more surfaces or portions of the support member 11 which may be arranged to face the second member 14. Of course, the expanse 47 represents the maximum width of the support member 11 that is to be accommodated by the notch 62 of the second member 14.

The range of the dimension 46 of the support member 11 that can be accommodated is quite large due to the expanse 44 of the notch 42 and the provision of the tangs 70. For example, support members 11 of various expanses (ranges of dimensions), materials, and types can be accommodated by the clamping arrangement 10. Thus, metallic and glass-reinforced support members of wide tolerances and finish variations can be accommodated. For example, the expanse 44 of the notch 42 can be selected so as to accommodate the maximum desired expanse 46 for the support member 11 to be accommodated. Thus, the minimum expanse 46 that could be accommodated would be defined by the placement and length of the tangs 70 to ensure suitable contact and tensioning of the support member 11 by the tangs 70. It should also be understood that the tangs 70 accommodate the range of the expanse 46 of the support member 11 by deformation.

In order to ensure against deformation and distortion of the web or base 36 of the first member 12 due to the potential of excessive clamping pressure and overtightening of the nuts 26,28 and referring now additionally to FIGS. 3 and 4, in a preferred embodiment, a spacer 80 is positioned between the web 36 of the first member element 12 and the top of the support member 11. The spacer 80 is of an appropriate height 82 to allow the proper range of clamping pressure while avoiding excessive distortion or deformation of the web 36. For example, the difference between the height 82 of the spacer 80 and the dimension 83 between the web 36 and the notch 42 at 74 is approximately 1/64 to 1/16 inch. In a specific embodiment, the spacer 80 is fabricated from cold rolled steel. It is preferable that the spacer 80 as shown in FIG. 3 assume an S shape so as to provide protection against deformation of the web 36 over a large expanse of the web while utilizing minimum material and being both held in position by and not interfering with the legs 30,32 of the U-bolt 16; i.e., the spacer 80 is oriented about the legs 30,32 as shown in FIG. 3, such that the spacer 80 is retained by the legs 30,32 during assembly. Of course, the spacer 80 is not required if the thickness of the first member 12 is sufficient to avoid excessive deformation.

In a specific embodiment, the notch 62 and flanges 58,60 of the second member 14 are omitted such that the support member 11 rests directly on the base portion 54.

Considering an alternate embodiment for the first member 12 and referring now to FIGS. 5 and 6, the first member 112 is similar to the first member 12 of FIGS. 1 and 2. However, the web 136 of the first member 112 includes a recessed central portion 137 arranged about the apertures 18,20 so as to be centered about the position of the bight 34 of the U-bolt 16 after assembly of the clamping arrangement 10. The dpeth 139 of the recessed central portion 137 is such as to position the lower surface 141 of the recessed central portion 137 a small predetermined dimension 143 above the height of the notch 142, corresponding generally to the notch 42 of FIGS. 1 and 2. This predetermined dimension 143 (for example, on the order of 1/32 inch for a web 136 having a thickness of ¼ inch) permits a predetermined amount of controlled deformation of the web 136 when the clamping arrangement 10 is assembled, yet avoids the bottoming-out or contacting of the lower surface 141 by the support member 11 before the support member 11 contacts the notch 142 at 148 and 174. The alternate first member 112 of FIGS. 5 and 6 is also useful to illustrate the tangs 70, including their placement and dimensioning.

Figure 8:
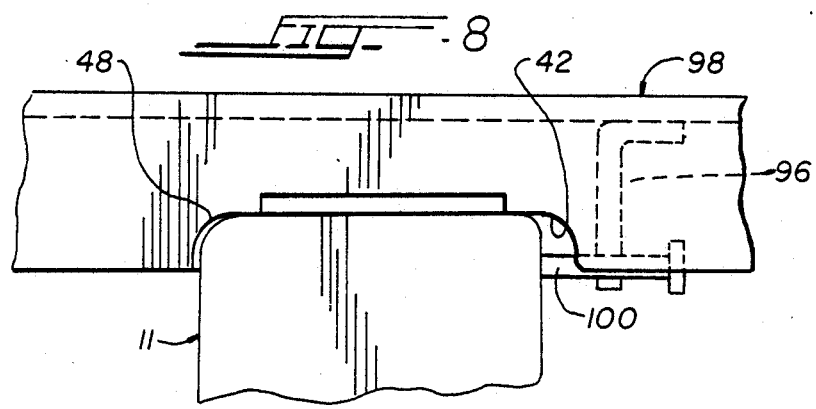
Figure 9:
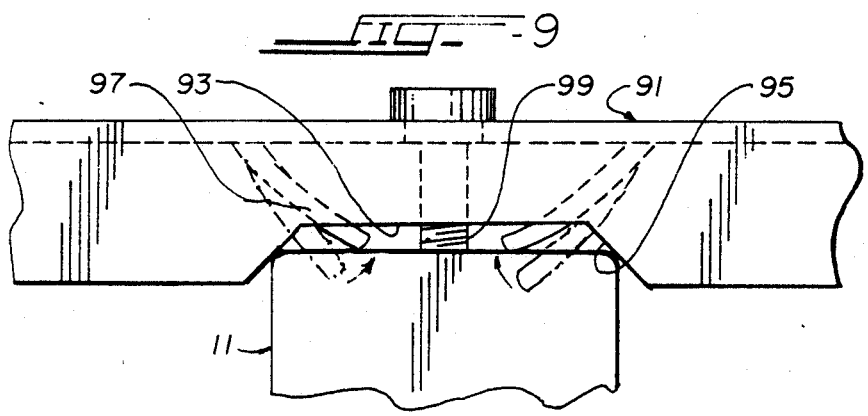

While there have been illustrated and described various embodiments of the present invention, it will be apparent that various changes and modifications will occur to those skilled in the art. For example, it should also be realized that facilities other than the U-bolt 16 can be utilized to clamp the first and second members 12,14 about the support member 11. In an alternative embodiment, the second member 14 can be deleted and the first member 12 clamped or attached to the support member in other convenient fashions. In another alternate embodiment, the tangs 70 are omitted and the expanse 44 of the notch 42 is approximately equal to the maximum expanse 46 of the support member 11 to be accommodated. In yet other alternative embodiments, in lieu of the tangs 70, other equivalent provisions may be utilized that are operative during or after the clamping together of the first and second members 12,14 about the support member 11 so as to force the support member 11 into engagement with the first end 48 of the notch 42. For example, referring to FIG. 8, a bracket 96 is attached to (or formed from) the first member 98. A bolt 100 is threaded through the bracket 96. The bolt 100 is tightened after assembly to engage the support member 11 and force the support member 11 against the first end 48 of the notch 42. Of course, the alternate arrangement of FIG. 8 is not self-aligning as the U-bolt 16 is tightened as in the embodiment of FIGS. 1 and 2. Considering another alternate arrangement and referring now to FIG. 9, the first member 91 includes a notch 93 that includes an inclined edge 95 at one or both ends. The support member 11 engages the inclined edges 95. Tangs 97 are provided solely to provide the desired securing force. Alternatively, a bolt 99 can be used in lieu of the tangs 97 to apply the securing force to secure the support member 11. It is intended in the appended claims to cover all such changes and modifications as fall within the true spirit and scope of the present invention.

What is claimed and desired to be secured by Letters Patent of the United States is:

1. A clamping arrangement that clamps a first member to a support member, the clamping arrangement comprising:
   a first member that includes a notched portion, said notched portion having a length that is greater than or equal to a predetermined portion of the support member that is assembled to said first member;
   a second member;
   means affixing and clamping said first and second members about the support member with the predetermined portion of the support member engaging said notched portion of said first member; and
   means engaging the support member and applying a force to the support member securing the support member in said notched portion so as to prevent movement of said first member relative to the support member, said force-applying means comprising one or more deformable members extending from said first member, said one or more deformable members being of sufficient rigidity so as to be deformed during the clamping of said first and second members about the support member and forcing the support member into engagement with a first end of said notched portion, said one or more deformable members extending adjacent to a second end of said notched portion.

2. The clamping arrangement of claim 1 wherein said first member includes a recessed portion in the vicinity of said notched portion.

3. The clamping arrangement of claim 2 wherein said recessed portion defines a predetermined distance from said recessed portion to said notched portion.

4. The clamping arrangement of claim 1 further comprising means for limiting deformation of said first member.

5. The clamping arrangement of claim 4 wherein said deformationlimiting means comprises a recessed portion of said first member.

6. The clamping arrangement of claim 1 wherein said force-applying means comprises means for accommodating support members of a predetermined range of dimensions.

7. The clamping arrangement of claim 1 wherein the support member is generally rectangular and the predetermined portion assembled to said first member has a width in a predetermined range of dimensions, the maximum width in said predetermined range being less than or equal to said length of said notched portion.

8. The clamping arrangement of claim 1 wherein each of said one or more deformable members defines a respective second edge of said notched portion.

9. The clamping arrangement of claim 8 wherein each of said one or more deformable members is integrally formed from said first member.

10. The clamping arrangement of claim 1 wherein said one or more deformable members are tang members that are lanced from said first member.

11. The clamping member of claim 1 wherein said affixing and clamping means comprises a U-bolt, said first and second members including apertures for passage of said U-bolt.

12. The clamping arrangement of claim 1 wherein said second member includes one or more apertures cooperating with said affixing and clamping means and one or more additional apertures.

13. The clamping arrangement of claim 12 wherein said second member is a dead-ending member.

14. The clamping arrangement of claim 1 wherein said first member comprises a generally planar first portion and two opposed flanges extending therefrom. each of said flanges including said notched portion.

15. The clamping arrangement of claim 1 further comprising a spacer member positioned between the support member and said first member.

16. The clamping arrangement of claim 15 wherein said spacer member includes two 180° bends and is generally S-shaped.

17. The clamping arrangement of claim 16 wherein said affixing and clamping means comprises a U-bolt having two legs and said spacer element is arranged such that said two 180° bends are arranged about said legs of said U-bolt.

18. The clamping arrangement of claim 1 wherein said second member includes a notch for receiving the support member, said notch having a length not less than a predetermined portion of the support member.

19. A clamping kit having component parts capable of being assembled about a support member for clamping a first member to the support member, the kit comprising the combination of:
a first member that includes a notched portion, said notched portion having a length that is greater than or equal to a predetermined portion of the support member;
a second member;
means affixing and clamping said first and second members about the support member, with the predetermined portion of the support member engaging said notched portion of said first member; and
means engaging the support member and applying a force to the support member securing the support member in said notched portion so as to prevent movement of said first member relative to the support member, said force-applying means comprising one or more deformable members extending from said first member, said one or more deformable members being of sufficient rigidity so as to be deformed during the clamping of said first and second members about the support member and forcing the support member into engagement with a first end of said notched portion, said one or more deformable members extending adjacent to a second end of said notched portion.

20. A clamping arrangement that clamps a first member to a support member, the clamping arrangement comprising:
a first member that includes a notched portion, said notched portion having a length that is greater than or equal to a predetermined portion of the support member that is assembled to said first member;
means affixing and clamping said first member to the support member with the predetermined portion of the support member engaging said notched portion of said first member; and
means engaging the support member and applying a force to the support member securing the support member in said notched portion so as to prevent movement of said first member relative to the support member, said force-applying means comprising one or more deformable members extending from said first member, said one or more deformable members being of sufficient rigidity so as to be deformed during the clamping of said first member to the support member and forcing the support member into engagement with a first end of said notched portion, said one or more deformable members extending adjacent to a second end of said notched portion; said affixing and clamping means comprises a U-bolt.

* * * * *

UNITED STATES PATENT AND TRADEMARK OFFICE
CERTIFICATE OF CORRECTION

PATENT NO. : 4,909,463

DATED : Mar. 20, 1990

INVENTOR(S) : Gary J. Zvanut, et al

It is certified that error appears in the above-identified patent and that said Letters Patent is hereby corrected as shown below:

<u>On the title page</u>:

Abstract, line 12, after "after" insert -- assembly --;

Col. 1, line 17, "S and C" should be -- S&C --;

Col. 3, line 17, "suupported" should be -- support --;
   line 42, after "¼" insert -- " -- (inch symbol);

Col. 5, line 29, "dpeth" should be -- depth --;
   line 30, after "such" insert -- so --;

Col. 6, line 54, claim 5, "deformationlimiting" should be -- deformation-limiting -- (hyphen between words).

Signed and Sealed this

Seventh Day of January, 1992

Attest:

HARRY F. MANBECK, JR.

*Attesting Officer*   *Commissioner of Patents and Trademarks*